UNITED STATES PATENT OFFICE.

RICHARD SHARP, OF PITTSBURG, PENNSYLVANIA, ASSIGNOR TO HIMSELF AND ROBERT W. HARE, OF SAME PLACE.

IMPROVEMENT IN COMPOSITIONS FOR BLACKBOARDS.

Specification forming part of Letters Patent No. 149,686, dated April 14, 1874; application filed October 25, 1873.

*To all whom it may concern:*

Be it known that I, RICHARD SHARP, of Pittsburg, in the county of Allegheny and State of Pennsylvania, have invented a new and useful Improvement in Composition for Blackboards, &c., of which the following is a specification:

The object of this invention is to furnish a composition to be spread upon wood, metal, or other material, to form a surface suitable for blackboards, slates, and for other purposes; and it consists of a compound composed of ground or powdered pumice-stone, colored to the proper shade by ivory-black or similar material.

The pumice-stone thus colored is mixed with coach-varnish and turpentine in sufficient quantity to form an adhesive plastic mass, with which wood, stone, metal, or other material is covered. The composition adheres firmly and soon dries, leaving a hard, smooth surface, admirably adapted for blackboards and slates, and for many other purposes.

I desire it to be distinctly understood that in the preparation of my compound for blackboards and slates I employ coach-varnish in connection with the other ingredients described, for said varnish possesses all the requisites of producing a smooth writing-surface, as it will dry quickly and in a uniform manner. Coach-varnish, as found in the market, consists of Zanzibar gum, which is brought to the proper consistency by boiling it down with oil. All other varnishes—as, for example, japan—contain a large percentage of shellac, the presence of which in my compound would be conducive of causing the slate-surface to be rough or irregular, and to peel off when dry.

Having thus described my invention, I claim as new and desire to secure by Letters Patent—

A blackboard or slate composed of pumice-stone, coach-varnish, turpentine, and a pigment, the various ingredients being mixed and applied upon a suitable backing, as herein set forth.

RICHARD SHARP.

Witnesses:
 WILLIAM GREEG JOHNSTON,
 JOSEPH A. TYSON.